United States Patent [19]

Hieger

[11] Patent Number: 4,558,548
[45] Date of Patent: Dec. 17, 1985

[54] NON-DISPLACEABLE SHIM

[75] Inventor: Richard A. Hieger, Centerville, Ind.

[73] Assignee: H. H. Robertson Company, Pittsburgh, Pa.

[21] Appl. No.: 552,416

[22] Filed: Nov. 16, 1983

[51] Int. Cl.$^4$ .............................................. F16B 43/00
[52] U.S. Cl. ................................. 52/235; 16/DIG. 39; 24/563; 24/571; 411/154; 411/539
[58] Field of Search ....................... 52/126.1, 235, 483, 52/509, 582; 24/563, 570, 571; 411/531–541, 147–157; 16/1 R, DIG. 6, DIG. 39; 403/409; 428/544, 596

[56] References Cited

U.S. PATENT DOCUMENTS

| | | | |
|---|---|---|---|
| 1,361,319 | 12/1920 | Flinn | 16/DIG. 39 |
| 1,748,412 | 2/1930 | Crawford | 16/DIG. 39 |
| 2,244,818 | 6/1941 | Woodruff | 411/539 X |
| 2,710,678 | 6/1955 | Rapisarda | 24/571 X |
| 3,333,309 | 8/1967 | Wistinghausen | 24/563 |
| 3,443,289 | 5/1969 | Crockett, Jr. | 24/563 X |
| 4,436,342 | 3/1984 | Nilson et al. | 403/409 X |

Primary Examiner—Donald G. Kelly
Assistant Examiner—Richard E. Chilcot, Jr.
Attorney, Agent, or Firm—George E. Manias

[57] ABSTRACT

A non-displaceable, self-righting shim for use in any application where critical alignment is required of adjacent vertical elements. The shim presents an elongated central opening including a large upper portion and a small lower portion, and a slot having an exit end communicating with the central opening and an entrance end at the perimeter edge of the shim. The weight distribution of the shim relative to the large upper portion is such that the shim will hang in a normal upright position with the small lower portion and the slot below the large upper portion. The arrangement assures positive placement of the shim once installed; avoids loosening and fall-off of the shim which may be caused by thermal expansion and contraction of the shimmed element and/or by vibrations associated with the adjacent vertical elements; and eliminates the need for holding the shim in position while securing the fastener.

8 Claims, 8 Drawing Figures

NON-DISPLACEABLE SHIM

BACKGROUND OF THE INVENTION

1. Field of the Invention

This invention relates generally to shim elements, and more particularly to shims of a non-displaceable, self-righting type.

2. Description of the Prior Art

Tolerances in the construction industry are such that the alignment of erected materials is never perfect. For example, the girts and subgirts of the structural framework of a building are intended to have outer faces reside in a vertically oriented working plane. Most often, the outer face of one or more of the girts or subgirts is inset from the working plane. When a panel member is erected on the framework, the fasteners are sufficiently tightened to place the panel member snug against the girt or subgirts. In the region of the out-of-plane girts or subgirts, the panel may bow inwardly creating an unsightly depression. Where the panel members have complementary mating elements along the joint edges, the mating element of the next-to-be-erected panel member cannot conform to the bowed configuration of the previously installed panel member, and cannot easily be installed.

Adjustments are required to overcome such out-of-plane deviations. The most common method of adjustment is to use shims or spacers interposed between the panel member and the out-of-plane girt or subgirt. Several types of shims or spacers have been used in the past, including rectangular pieces of material, a standard round washer with a central aperture, and a horseshoe-shaped shim.

While a shim formed of a rectangular piece of material is easily found around the jobsite, positive placement of such shims is not possible. Such shims may work loose during thermal expansion and contraction of the panels and fall off. The once-secure panel portion is now free to vibrate under varying wind conditions.

Standard round washers with a central aperture have been used and are positively placed once installed. However it is extremely difficult and very time-consuming to hold one or more of the standard round washers in position while threading the fastener through the registered central apertures.

U-shaped washers have been used and are most easily installed. The U-shaped washer is dropped over the fastener and thereafter the fastener is tightened. The U-shaped washer can work loose during thermal expansion and contraction of the panel and if rotated sufficiently about the fastener, may fall off.

SUMMARY OF THE INVENTION

The principal object of this invention is to provide a novel shim which overcomes all of the above-described problems.

Another object of this invention is to provide a shim which is non-displaceable and which is self-righting.

Still another object of this invention is to provide a shim having a unique entrance slot and central aperture arrangement which facilitates installation and which assures positive placement once installed.

A further object of this invention is to provide a shim which does not have to be held in position while the fastener is secured.

The present invention provides a non-displaceable, self-righting shim comprising a plate of substantially uniform thickness, having a perimeter edge. The plate is provided with an elongated central opening which includes a large upper portion and a small lower portion; and with a slot having an exit end communicating with the central opening and an entrance end at the perimeter edge. The slot is inclined such that the entrance end resides below and to one side of the exit end and of the central opening. The plate has a center of gravity within the central opening but below the geometric center of the large upper portion. The overall arrangement is such that when the shim is dropped over a fastener shank, the shim will move under the influence of its weight and come to rest with the fastener shank engaging the peripheral edge of the large upper portion and with the small lower portion and the slot below the level of the fastener shank.

In the preferred arrangement, the large upper portion and the small lower portion comprise segments of circles. An edge connects those corresponding sides of the large upper portion and of the small lower portion which are opposite to the exit end of the slot. In addition, the large upper portion includes a node adjacent to the exit end of the slot which projects into the central opening. The node serves to bias the shim in a direction which maintains engagement of the fastener shank with the periphery of the central opening.

The present shim is useful in a wall structure of the type comprising vertically spaced-apart horizontal frame members having outboard faces defining a working plane, and at least first and second panel members spanning across the frame members and having inner faces intended to be supported at the working plane. The panel members have a joint therebetween including connecting means connecting the longitudinal edge of the second panel member to the longitudinal edge of the first panel member. Fastening means is provided which secures the longitudinal edge of the first panel member to the frame members. In the event the inner face of one or more frame members is inset from the working plane, one or more of the present shims is interposed between the first panel member and the inset frame member to support the first panel member with the inner face thereof substantially at the working plane. The width of the shim or shims is such that the second panel also is supported with the inner face thereof substantially at the working plane.

DESCRIPTION OF THE PREFERRED EMBODIMENT(S)

Figure 1:
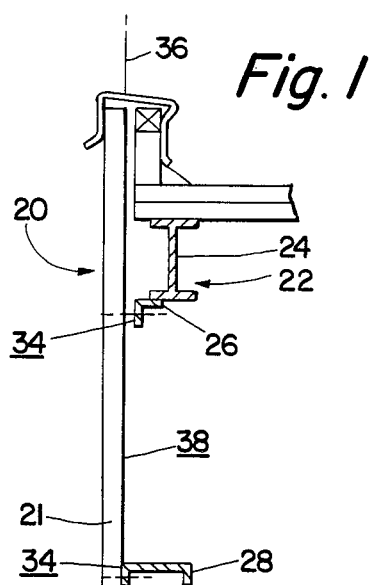
FIG. 1 is a vertical cross-sectional view through a wall structure.

FIG. 1 illustrates a wall structure 20 including plural panels 21 (only one visible) erected on a steel framework 22 of a building. The framework 22 includes vertical columns (not illustrated), horizontal beams 24 and plural girts 26, 28, 30 and 32, each presenting an outboard face 34. The outboard faces 34 of the frame members 28 and 32 define a working plane illustrated by the dash-dot line 36. For the purpose of illustration, the outboard faces 34 of the frame members 26 and 30 are shown inset from the working plane 36, that is spaced-apart from the inner face 38 of the panel members 21. As is the normal practice, one or more shims must be installed between the panel members 21 and the frame members 26, 30 to provide a firm support for the panel members 21 and to preclude undesirable deformation of the panel members 21 when the fasteners are tightened.

Figure 2:
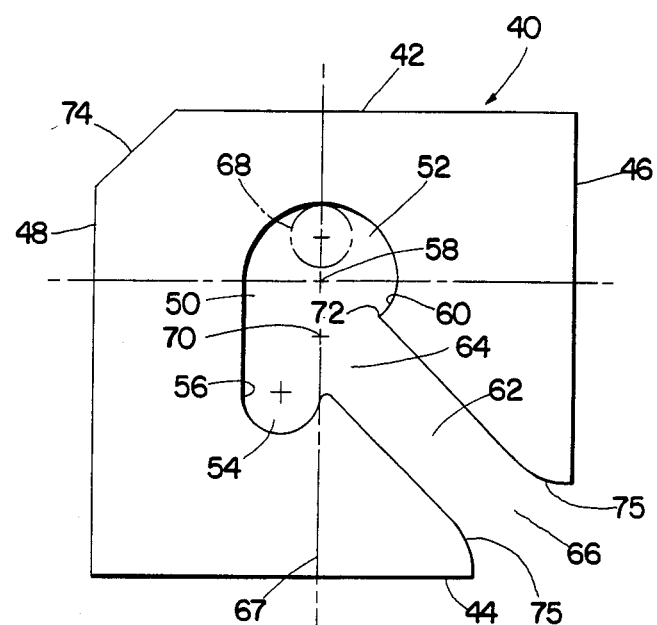
FIG. 2 is an elevation view of a shim of this invention.

FIG. 2 illustrates a shim 40 of this invention, formed from any suitable material having substantially uniform thickness. The shim 40 has a perimeter edge including a top edge 42, a bottom edge 44, and opposite side edges 46, 48. An elongated central opening 50 is provided in the shim 40, including a large upper portion 52 and a small lower portion 54, the portions 52 and 54 comprising segments of circles connected by a straight edge 56 which is tangent to those sides of the portions 52, 54 adjacent to the side edge 48 of the shim 40. The large upper portion 52 has a geometric center at 58 and extends from the straight edge 56 in a clockwise direction for about 180 angular degrees. The large upper portion 52 terminates in an arc segment 60 having a radius which is smaller than that of the upper portion 52. The shim 40 is provided with a slot 62 having an exit end 64 communicating with the central opening intermediate of the upper and lower portions 52, 54 and opposite thereto an entrance end 66 at the perimeter edge of the shim 40. The slot 62 is inclined at about 45 angular degrees with respect to the vertical centerline 67.

A fastener shank 68 is shown in dotted outline in FIG. 2, engaged with the peripheral edge of the upper portion 52. The central opening 50 and the slot 62 are located in the shim 40 such that the shim 40 presents a center of gravity 70 which is below the geometric center 58 of the upper portion 52. When installed on the fastener shank 68, the shim 40 will hang in a normal position illustrated in FIG. 2.

The arc segment 60 cooperates with the contiguous edge of the slot 62 to define a node 72 which projects into the central opening 50. Should the shim 40 be rotated in a counterclockwise direction as seen in FIG. 2, so that the fastener shank 68 engages the arc segment 60, the node 72 will bias the shim 40 in a clockwise direction so as to maintain the peripheral edge of the upper portion 50 engaged with the fastener shank 68.

That corner of the shim 40 opposite the entrance end 66 of the slot 62, is cut off to provide a flat transverse edge 74 which is adapted to receive the blows of a shim-installing-tool, such as a hammer without deforming the perimeter edge of the shim 40.

The slot 62 presents outwardly flared edges 75 at the entrance end 66 thereby enlarging the entrance end 66 and facilitating introduction of the fastener shank 68 into the slot 62.

The shim 40 may be made in a variety of thicknesses and from any suitable material, such as aluminum, metal coated steel, and plastic materials—the material of construction being governed by the structure on which the shim 40 is used. The material of construction for the shim 40 also can be selected to eliminate the corrosive action between dissimilar materials.

Figure 3:
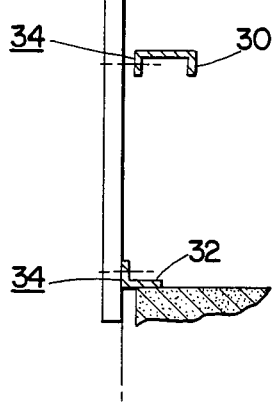
FIGS. 3 and 4 are elevation views of shims having central openings of alternate configurations.
Figure 4:
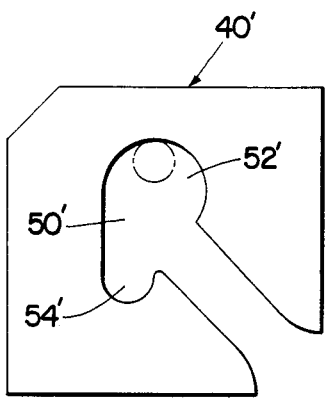

FIGS. 3 and 4 illustrate shims 40' and 40", respectively, presenting elongated openings 50' and 50" of alternative configuration. In FIG. 3, the elongated opening 50' has upper and lower portions 52', 54' each comprising a segment of an ellipse. In FIG. 4, the elongated opening 50" includes upper and lower portions 52", 54" each comprising a segment of a polygon.

FIGS. 2 to 4 illustrate shims 40, 40', 40" having a polygonal peripheral shape, specifically a rectangular shape. The shims 40, 40', 40" may have any other desired peripheral shape so long as the geometric center 58 of the upper portion 52 is well above the geometric center of the shim 40 and so long as a major portion of the elongated opening 50 and the slot 62 are below the geometric center 58 of the upper portion 52. Thus configured, the shim 40 will have a natural tendency to rotate into the upright position illustrated in FIGS. 2 through 4.

Figure 5:
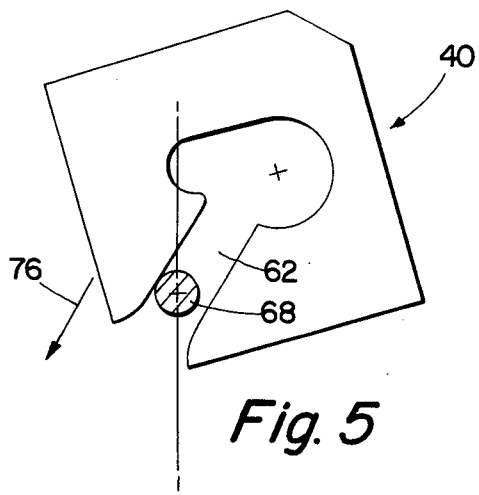
FIGS. 5 and 6 are elevation views illustrating the installation of the present shim on a fastener.
Figure 6:
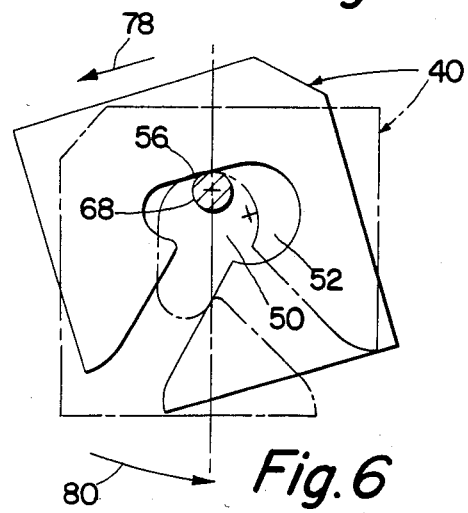

FIGS. 5 and 6 illustrate the installation of the shim 40 on the fastener shank 68 and rotation of the shim 40 into the normal upright position. In FIG. 5, the slot 62 receives the fastener shank 68. The shim 40 will slide in the direction of the arrow 76 until, as shown in FIG. 6, the fastener shank 68 engages the peripheral edge of the central opening 50, e.g. the edge 56. Under the influence of its own weight, the shim 40 will slide along the fastener shank 68 in the direction of the arrow 78 and thereafter rotate about the fastener shank 68 and in the direction of the arrow 80 until the shim 40 comes to rest in its normal upright position, as shown in dotted outline in FIG. 6.

Figure 7:
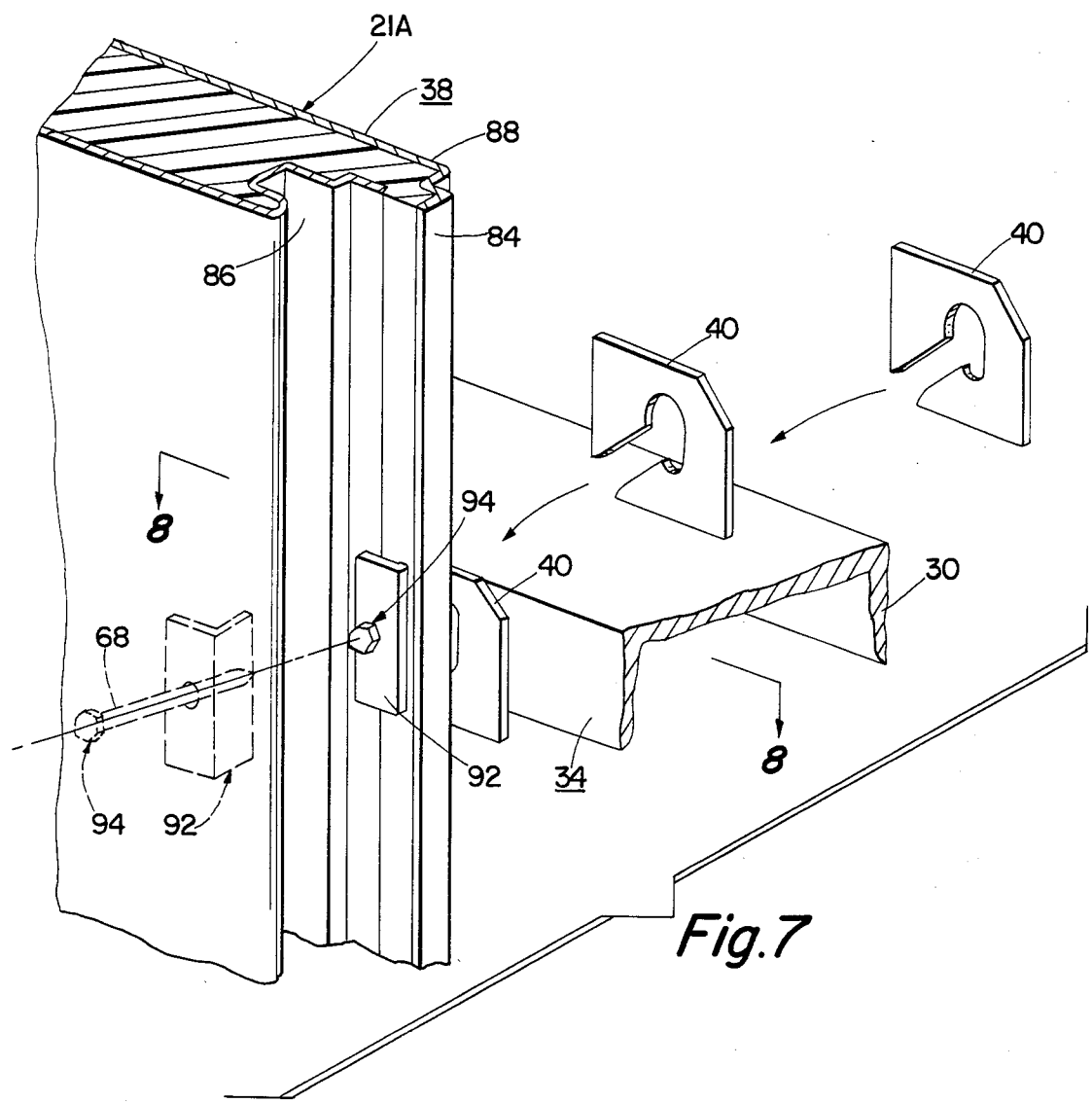
FIG. 7 is a fragmentary isometric view, partly in exploded form, illustrating one or more of the present shims being installed in the wall structure of FIG. 1.
Figure 8:
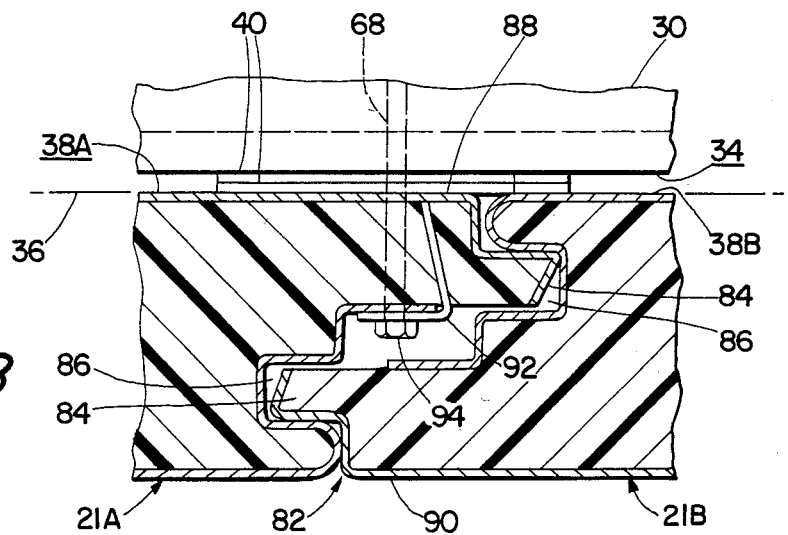
FIG. 8 is a cross-sectional view taken along the line 8—8 of FIG. 7.

By way of example, FIGS. 7 and 8 illustrate the use of one or more of the shim members 40 at a shiplap joint 82 (FIG. 8) formed between the first and second panel members 21A, 21B. In FIGS. 7 and 8, the panel members 21A, 21B cross over the frame member 30 which, as explained above, has its outboard face 34 inset from the working plane 36 (FIG. 8). The panel members 21A, 21B present connecting means, such as a tongue 84 and a complimentary groove 86 along each of the opposite longitudinal sides thereof, which connects the panel member to the now-secured panel member 21A, 21B as shown in FIG. 8. Each of the panel members 21A, 21B presents a lapped edge portion 88 and an overlapping edge portion 90 along the opposite longitudinal edges thereof which form the shiplap joint 82. Fastening means, such as a clip 92 and a fastener 94, penetrate the first panel member 21A at the lapped edge portion 88 and secures the panel member 21A to the frame member 30.

Prior to tightening the fastener 94 (FIG. 7), one or more of the shims 40 are dropped over the shank 68 of the fastener 94 in the region between the inner face 38A of the panel member 21A and the outboard face 34 of the frame member 30. Once the inner face 38A of the panel member 21A is supported by the shims 40 substantially at the working plane 36 (FIG. 8), the fastener 94 is tightened thereby firmly securing the panel member 21A to the frame member 30. Thereafter, the panel member 21B is installed as shown in FIG. 8 and thereafter the introduction of one or more shims is repeated at the opposite edge of the panel member 21B.

It will be observed in FIG. 8 that the shims 40 are sufficiently wide so as to span across the shiplap joint 82. Thus the shims 40 also engage the inner face 38B of the panel member 21B and support the same substantially at the working plane 36.

I claim:

1. A wall structure comprising vertically spaced-apart horizontal frame members having outboard faces defining a working plane, at least a first frame member having the outboard face thereof inset from said working plane, first and second panel members spanning across said frame members, a joint between said panel members, fastening means pentrating the first panel at said joint and securing the same to said frame members, connecting means connecting the second panel to the first panel, and at least one shim interposed between the first panel and said first frame member to support said first panel member with the inner face thereof substantially at said working plane, said shim comprising:

- a plate of substantially uniform thickness, said plate having a perimeter edge;
- an elongated central opening in said plate including a large upper portion and a small lower portion, said fastener engaging the periphery of said large upper portion; and
- a slot in said plate having an exit end communicating with said central opening and an entrance end at said perimeter edge;
- said plate having a center of gravity within said central opening but below the geometric center of said large upper portions;
- whereby said shim hangs from said fastener under the influence of its weight with the small lower portion and said slot disposed below the level of said fastener.

2. The wall structure as defined in claim 1 wherein said shim spans across said joint and supports said first and second panel members.

3. A non-displaceable, self-righting shim comprising:
- a plate of substantially uniform thickness, said plate having a perimeter edge;
- an elongated central opening in said plate including a large upper portion and a small lower portion; and
- a slot in said plate having an exit end communicating with said central opening and an entrance end at said perimeter edge, said entrance end residing below and to one side of said exit end and of said central opening;
- said large upper portion and said small lower portion comprising segments of circles connected by an edge which is tangent to that side of said large upper portion and of said small lower portion opposite to said end of said slot;
- said plate having a center of gravity within said central opening but below the geometric center of said large upper portion;
- whereby when said shim is dropped over a fastener shank, said shim will move under the influence of its weight and come to rest with the fastener shank engaged with the peripheral edge of said large upper portion, and with said small lower portion and said slot below the level of said fastener shank.

4. The shim as defined in claim 3 wherein said exit end communicates with said central opening at a location intermediate of said large upper portion and said small lower portion.

5. The shim as defined in claim 3 wherein said large upper portion includes a node adjacent to said exit end of said slot and which projects into said central opening, said node serving to bias said shim in a direction which maintains engagement of the fastener shank with the peripheral edge of said central opening.

6. The shim as defined in claim 3 wherein said plate has a generally rectangular configuration including four corners, said entrance end of said slot being disposed at one of said corners, and the corner diagonally opposite to said entrance and being cut off to provide a flat transverse edge adapted to receive the blows of a shim-installing-tool without deforming said perimeter edge.

7. The shim as defined in claim 3 wherein the width of said slot is less than the center-to-center distance between said large upper portion and said small lower portion.

8. The shim as defined in claim 3 wherein the opposite edges of said entrance end are flared outwardly.

* * * * *